Inventors
Charles R. Clemence
John Humphries
By Stevens, Davis, Miller & Mosher
Attorneys

United States Patent Office 3,296,427
Patented Jan. 3, 1967

3,296,427
RESOLVER FOR TRIGONOMETRIC FUNCTIONS
Charles R. Clemence and John Humphries, Ottawa, Ontario, Canada, assignors to National Research Council, Ottawa, Ontario, Canada, a body corporate of Canada
Filed Apr. 1, 1963, Ser. No. 269,474
Claims priority, application Canada, Jan. 23, 1963, 867,188
1 Claim. (Cl. 235—186)

This invention relates to a resolver for generating trigonometric functions, more particularly the sine and cosine functions of a known input angle. Once the sine and cosine functions have been generated, the other trigonometric functions can be readily derived therefrom.

Such resolvers are already well known. Essentially they consist of a stator and a rotor. The stator includes one or more fixed coils for inserting a function, such as a voltage E, and generating a corresponding linear magnetic field. The rotor comprises a pair of mutually perpendicular coils rotatable in the field between the stator pole pieces to take up any desired angle to such field. The outputs from the respective coils represent the functions E sin $\theta$ and E cos $\theta$, where $\theta$ is the angle of rotation of the rotor relative to the direction of the field.

Practical commercial resolvers invariably have an error, known as the interaxis error, which is the result of a lack of true perpendicularity between the rotor coils. It results from a compound of mechanical tolerances and the effect of the finite size of the coils. Precision manufacture can reduce this interaxis error, typically down to a value of about one tenth of a degree, but it cannot be entirely eliminated, certainly not by any means which would be economically feasible. It must be borne in mind that many of the resolvers used industrially are often small instruments having a rotor diameter of the order of only half an inch, and an overall diameter of only about one inch.

The purpose of the present invention is to provide means for compensating for the interaxis error in a resolver, in a manner which achieves substantially higher accuracy in the final output than has hitherto proved practicable in normal commercial manufacture.

This object is achieved in the present invention by a resolver having
  (a) A stator structure,
  (b) A rotor structure including two generally mutually perpendicular coils,
  (c) Means for deriving a function linearly proportional to the output of a first one of said coils, and
  (d) Means for generating the algebraic sum of said function and the output of the other of said coils.

One manner in which the present invention may be carried into practice is illustrated diagrammatically in the accompanying drawings. It is to be understood that this illustration and the following description is provided by way of example only and that the scope of the invention is limited only by the appended claims.

Figure 1:
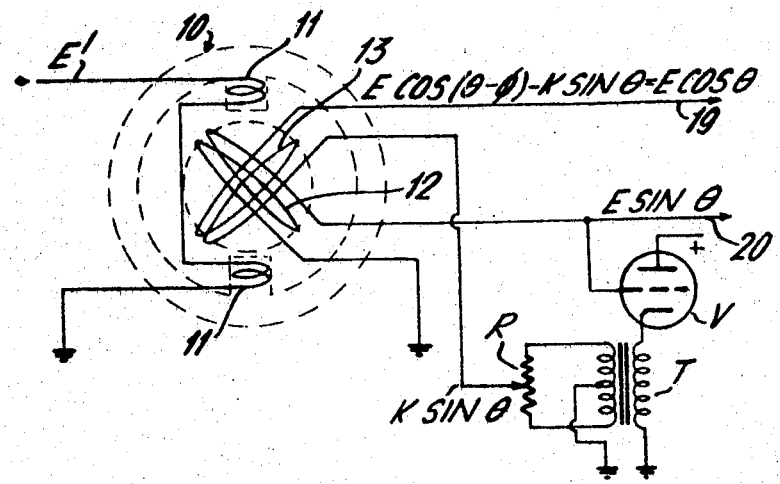
Figure 2:
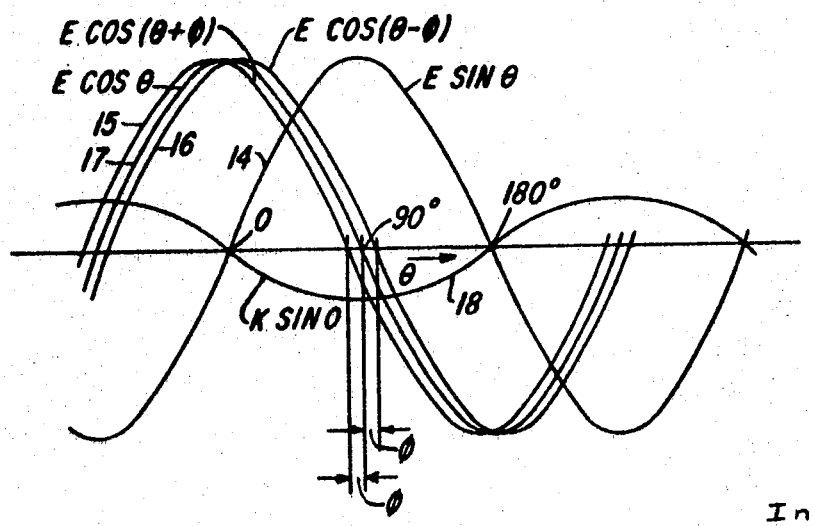

FIGURE 1 shows the resolver, and
FIGURE 2 is an explanatory plot.

FIGURE 1 shows diagrammatically a resolver 10 having serially connected stator coils 11 and a pair of rotor coils 12 and 13. Coils 12 and 13 are mounted as nearly perpendicular to each other as commercially practicable and are assumed to be rotatable in the field of the magnetic circuit of the coils 11. These coils 12 and 13 will be rotated, in the conventional manner of resolvers, by a shaft having a position represented as the angle $\theta$ between a line perpendicular to the axis of coil 12 and the direction of the field. For an input E' at coils 11, coil 12 will generate the function E sin $\theta$ and coil 13 will generate the function E cos $(\theta - \phi)$, where $\phi$ is the interaxis error, that is the deviation from true perpendicularity of coils 12 and 13.

FIGURE 2 shows a plot of these functions against $\theta$ with a much exaggerated value for the interaxis error $\phi$. Curve 14 shows the function E sin $\theta$; curve 15 the function E cos $(\theta - \phi)$; curve 16 the function E cos $(\theta + \phi)$; and curve 17 the function E cos $\theta$. It is evident that the curve 17, E cos $\theta$, is midway between the curves 15, E cos $(\theta - \phi)$, and 16, E cos $(\theta + \phi)$, and that a correction to either of the latter equal to a half the difference between them, and in the correct sense, will result in the curve 17 E cos $\theta$. This may be shown mathematically as $\frac{1}{2}E[\cos(\theta+\phi) - \cos(\theta-\phi)]$
$= \frac{1}{2}E[\cos\theta\cos\phi - \sin\theta\sin\phi - \cos\theta\cos\phi - \sin\theta\sin\phi]$
$= \frac{1}{2}E[-2\sin\theta\sin\phi]$
$= -E\sin\theta\sin\phi$
$= -K\sin\theta$ (curve 18)

where $K = E\sin\phi$.

Thus for any particular resolver we can write

E cos $(\theta+\phi) + K$ sin $\theta = E$ cos $\theta$, or
E cos $(\theta-\phi) - K$ sin $\theta = E$ cos $\theta$ the sign of the second term being determined by the sense of the interaxis error.

A triode V (functioning as a negative feedback amplifier) has its control grid connected to the output E sin $\theta$ so as to generate in its load resistor R connected across transformer T the function K sin $\theta$, where the amplitude and sign of the ratio K to E (sin $\phi$) is determined by the position of the slider on the resistor R. This slider is connected in series with coil 13, so that the total effective output of the latter is E cos $(\theta-\phi) - K$ sin $\theta$ or E cos $(\theta+\phi) + K$ sin $\theta$ depending on the sense of the error $\phi$, as may be required to generate E cos $\theta$.

Although it is extremely difficult in normal manufacture to eliminate mechanically the interaxis error in a resolver, no trouble is experienced in measuring such error quite accurately and for any given resolver the angle $\phi$ will be accurately known. Indeed this is a function normally quoted when specifying the characteristics of a given commercial resolver. Thus, for any given resolver, K will be similarly capable of determination and, once the resistor R has been set, it will not normally be necessary to change the setting. Indeed this setting may conveniently be arrived at experimentally without the need to derive K mathematically. Subsequent use of the resolver will then furnish the outputs E sin $\theta$ and E cos $\theta$ on output lines 20 and 19, respectively, with output errors resulting from the interaxis error reduced to a negligible amount.

We claim:
A resolver for trigonometric functions comprising
  (a) a stator structure,
  (b) a rotor structure including two generally mutually perpendicular coils having respective outputs of E sin $\theta$ and E cos $(\theta-\phi)$ where $\theta$ is the rotor to stator angle and $\phi$ is the angle of deviation of said coils from true mutual perpendicularity,
  (c) means for deriving the function K sin $\theta$ from the output of the first of said coils, where K is a fraction of E,
  (d) and means for generating the algebraic sum of K sin $\theta$ and E cos $(\theta-\phi)$ to generate the function E cos $\theta$,

(e) and wherein said means for deriving said function K sin θ comprises an electron tube having its input connected to the output of said first coil and the primary of a transformer in its output circuit, the secondary of said transformer being centre tapped to ground and a resistor being connected across the ends of said secondary, a movable tap on said resistor detecting the function K sin θ whereby the value of K may be positive or negative.

References Cited by the Examiner

UNITED STATES PATENTS 2,706,080   4/1955   Carney et al. _____ 235—191

MALCOLM A. MORRISON, *Primary Examiner.*

ROBERT C. BAILEY, *Examiner.*

A. J. SARLI, *Assistant Examiner.*